(12) United States Patent
Farkas et al.

(10) Patent No.: US 11,396,281 B2
(45) Date of Patent: Jul. 26, 2022

(54) CONTROL DEVICE FOR A PARKING BRAKE DEVICE OF A VEHICLE

(71) Applicant: KNORR-BREMSE Systeme fuer Nutzfahrzeuge GmbH, Munich (DE)

(72) Inventors: Gabor Farkas, Kecskemet (HU); Laszlo Koncz, Kecskemet (HU)

(73) Assignee: KNORR-BREMSE Systeme fuer Nutzfahrzeuge GmbH, Munich (DE)

(\*) Notice: Subject to any disclaimer, the term of this patent is extended or adjusted under 35 U.S.C. 154(b) by 137 days.

(21) Appl. No.: 17/045,279

(22) PCT Filed: Mar. 25, 2019

(86) PCT No.: PCT/EP2019/057413
§ 371 (c)(1),
(2) Date: Oct. 5, 2020

(87) PCT Pub. No.: WO2019/192868
PCT Pub. Date: Oct. 10, 2019

(65) Prior Publication Data
US 2021/0171002 A1 Jun. 10, 2021

(30) Foreign Application Priority Data
Apr. 5, 2018 (DE) ...................... 10 2018 108 005.0

(51) Int. Cl.
*B60T 7/20* (2006.01)
*B60T 7/08* (2006.01)
(Continued)

(52) U.S. Cl.
CPC .................. *B60T 7/20* (2013.01); *B60T 7/08* (2013.01); *B60T 13/265* (2013.01);
(Continued)

(58) Field of Classification Search
CPC . B60T 7/08; B60T 7/20; B60T 13/265; B60T 13/385; B60T 15/041; B60T 2270/40; B60T 2270/402; B60T 2270/403
(Continued)

(56) References Cited

U.S. PATENT DOCUMENTS 4,813,518 A \* 3/1989 Akiyama ................ B60T 13/12
188/170
6,669,307 B1 12/2003 Vollmer
(Continued)

FOREIGN PATENT DOCUMENTS

DE           43 27 759 A1    3/1995
DE   10 2007 002 020 A1    7/2008
(Continued)

OTHER PUBLICATIONS

International Preliminary Report on Patentability (PCT/IB/326 & PCT/IB/373) issued in PCT Application No. PCT/EP2019/057413 dated Oct. 15, 2020, including English translation of document C2 (German-language Written Opinion (PCT/ISA/237) previously filed on Oct. 5, 2020) (seven (7) pages).
(Continued)

*Primary Examiner* — Thomas J Williams
(74) *Attorney, Agent, or Firm* — Crowell & Moring LLP

(57) ABSTRACT

A utility vehicle control device for a parking brake device of a trailer vehicle includes a pneumatic supply connection, a control connection for controlling a spring brake cylinder, a directly manually actuatable parking valve, a first connection line and a control valve for controlling the parking valve. The parking valve is arranged in the first connection line, and wherein as a result of the parking valve, the supply connection and the control connection can be connected via the first connection line. A control line branches from the first connection line. The control line is connected to a first
(Continued)

pneumatic control input of the control valve, wherein the control valve has a second pneumatic control input. In the event of an unexpected reduction in operating pressure in the first connection line and/or in the control line, the control valve can be controlled by the first or second control input of the control valve such that a switching state of the parking valve can be pneumatically controlled by the control valve independently of an operating state of the supply connection, whereby the control connection is ventilated by the parking valve.

20 Claims, 3 Drawing Sheets

(51) Int. Cl.
*B60T 13/26* (2006.01)
*B60T 13/38* (2006.01)
*B60T 15/04* (2006.01)
*B60T 17/04* (2006.01)

(52) U.S. Cl.
CPC .......... *B60T 13/385* (2013.01); *B60T 15/041* (2013.01); *B60T 17/04* (2013.01); *B60T 2270/402* (2013.01); *B60T 2270/403* (2013.01)

(58) Field of Classification Search
USPC .............. 303/3, 14, 15, 13, 122.04, 122.05, 303/122.09, 122.15
See application file for complete search history.

(56) References Cited

U.S. PATENT DOCUMENTS

| 2012/0001477 A1 | 1/2012 | Mederer |
| 2013/0184957 A1 | 7/2013 | Herges et al. |
| 2018/0222463 A1 | 8/2018 | Risse et al. |
| 2018/0229708 A1 | 8/2018 | Sieker et al. |

FOREIGN PATENT DOCUMENTS

| DE | 10 2007 038 472 A1 | 2/2009 | | |
| DE | 10 2008 003 525 A1 | 7/2009 | | |
| DE | 10 2008 060 912 A1 | 6/2010 | | |
| DE | 10 2010 021 909 A1 | 12/2011 | | |
| DE | 10 2013 106 260 A1 | 12/2014 | | |
| DE | 10 2015 007 383 A1 | 12/2016 | | |
| DE | 10 2015 007 384 A1 | 12/2016 | | |
| EP | 2 058 185 A2 | 5/2009 | | |
| EP | 2 058 186 A2 | 5/2009 | | |
| EP | 2 058 188 A1 | 5/2009 | | |
| EP | 2 058 193 A2 | 5/2009 | | |
| EP | 2 426 021 A1 | 3/2012 | | |
| EP | 2 757 006 A1 | 7/2014 | | |
| EP | 2 757 010 A1 | 7/2014 | | |
| EP | 2 757 011 A1 | 7/2014 | | |
| EP | 3 150 450 A1 | 4/2017 | | |
| GB | 2184405 A | * | 6/1987 | ......... B60G 17/0523 |
| GB | 2417764 A | | 3/2006 | |
| GB | 2472461 A | * | 2/2011 | ............ B60T 13/263 |
| GB | 2546254 A | | 7/2017 | |
| WO | WO 2006/024864 A1 | 3/2006 | | |
| WO | WO 2012/175927 A1 | 12/2012 | | |

OTHER PUBLICATIONS

International Search Report (PCT/ISA/210) issued in PCT Application No. PCT/EP2019/057413 dated May 16, 2019 with English translation (six (6) pages).

German-language Written Opinion (PCT/ISA/237) issued in PCT Application No. PCT/EP2019/057413 dated May 16, 2019 (five (5) pages).

Cover Page of reference EP 1 789 296 A1 published May 30, 2007 (one (1) page).

* cited by examiner

CONTROL DEVICE FOR A PARKING BRAKE DEVICE OF A VEHICLE

BACKGROUND AND SUMMARY OF THE INVENTION

The present invention relates to a control device for a parking brake device of a trailer vehicle of a utility vehicle having at least one pneumatic supply connection, having at least one control connection, in particular for controlling at least one spring-loaded brake cylinder, having at least one parking valve, having at least one first connecting line and having at least one control valve for controlling the parking valve.

An incorrect coupling sequence of the compressed air connections in a trailer vehicle of a utility vehicle can result in the trailer vehicle being set in motion in an unbraked fashion and bringing about severe damage. Therefore, in order to increase the operational safety of such trailer vehicles a control device should be provided which safely brakes the trailer vehicle even in the case of incorrect coupling.

DE 43 27 759 A1 therefore discloses a compressed air brake system for utility vehicles which is provided with a compressed air supply having a reservoir vessel, and at least one axle which is equipped with spring-loaded brake cylinders and in which a parking brake valve is provided in a line leading from the reservoir vessel to the spring-loaded brake cylinders.

In addition, DE 10 2007 002 020 A1 discloses a trailer vehicle brake and air suspension system with a lifting/lowering valve which is supplied with reservoir pressure from the reservoir pressure vessel of the air suspension system, in order to change the ride level of the trailer vehicle by changing the quantity of air in supporting bellows of the trailer vehicle, having a trailer brake valve or parking release safety valve for automatically braking the trailer vehicle when the reservoir line breaks off.

Furthermore, DE 10 2007 038 472 A1 presents a valve arrangement for controlling a brake system containing at least one spring-loaded brake cylinder and at least one service brake cylinder, of a trailer vehicle of a tractor-trailer combination.

In addition, DE 10 2008 003 525 A1 discloses a pneumatic parking brake device of an at least dual-axle trailer vehicle, having an articulated front axle, of a tractor-trailer combination having a first valve device for controlling a passive brake at a rear axle of the trailer vehicle and having a second valve device for controlling an active brake at a front axle of the trailer vehicle.

DE 10 2008 060 912 A1 also presents a pneumatic brake system with a parking valve which is arranged in the region of a trailer, can be activated manually and has a) a first operating position in which a spring-loaded brake of the trailer is effective, and b) a second operating position in which the spring-loaded brake is released, characterized in that c) a sensing device for the operating state of the spring-loaded brake of the trailer or of the parking valve is provided, d) the trailer has a transmission device via which the operating state of the spring-loaded brake, sensed by the sensing device, can be transmitted to a tractor vehicle.

DE 10 2015 007 383 A1 also discloses a valve arrangement for ventilating spring-loaded brake cylinders in a trailer vehicle with a pneumatic brake system, having a first connection for a line which is connected to a reservoir vessel of the trailer vehicle, having a second connection for a line which leads to the spring-loaded brake cylinders, and having a first pneumatic control unit, wherein the first connection can be connected to the second connection as a function of the pressure at the first control inlet. According to the invention there is provision that the first control inlet is connected to a line which is connected to a control connection of the trailer vehicle, or to a line which is connected to the reservoir vessel.

EP 1 789 296 A1 further presents a brake system for a trailer comprising a service brake system which is operated with fluid pressure, a parking brake with a spring drive which is able to produce a braking force at the parking brake, and an electrical connection for exciting a solenoid valve, wherein the fluid pressure is fed to the drive by means of a parking brake valve, so that in a first state of the parking brake valve the parking brake is held in the off position, and the elimination of the fluid pressure brings about activation of the parking brake.

Further control devices of this kind for parking brake devices of a vehicle are disclosed in EP 2 058 185 A2, DE 10 2015 007 384 A1, EP 2 058 186 A2, EP 2 058 188 A1, EP 2 058 193 A2, EP 2 426 021 A1, EP 2 757 006 A1, EP 2 757 010 A1, EP 2 757 011 A1, EP 3 150 450 A1, GB 2546254 A, U.S. Pat. No. 6,669,307 B1 and WO 2012/175927A1.

Owing to the complex pneumatic switching arrangements and the, to a certain extent, limited pneumatic control possibilities of the parking valve, there is an increased probability of malfunction with control devices according to the prior art.

An object of the present invention is to advantageously develop a control device for a parking brake device of a trailer vehicle of the type mentioned at the beginning, in particular to the effect that the control device is of simpler design and its operating reliability is improved.

This object is achieved according to the invention by a control for a parking brake device of a trailer vehicle of a utility vehicle having at least one pneumatic supply connection, having at least one control connection, in particular for controlling at least one spring-loaded brake cylinder, having at least one directly manually actuable parking valve, having at least one first connecting line and having at least one control valve for controlling the parking valve. The parking valve is arranged in the first connecting line, wherein the supply connection and the control connection can be connected by way of the parking valve via the first connecting line. At least one control line is branched off from the first connecting line and is connected to at least one first pneumatic control inlet of the control valve. The control valve has at least one second pneumatic control inlet, and wherein in the case of an unexpected reduction in operating pressure in the first connecting line and/or in the control line, the control valve can be controlled by way of its second control inlet in such a way that at least one switched state of the parking valve can be activated pneumatically by the control valve independently of at least one operating state of the supply connection, as a result of which in particular the control connection is vented by way of the parking valve.

The invention is based on the basic concept that in order to increase the operational safety of a trailer vehicle of a utility vehicle a directly manually actuable parking valve is activated pneumatically by means of a separate control valve which has two pneumatic control inlets. For this purpose, the first control inlet is connected to the first connecting line, which can in turn be connected to a fluid pressure source in the form of a coupling head of the utility vehicle via the supply connection of the control device. If undesired movement of the trailer vehicle occurs owing to an incorrect coupling sequence, this results e.g. in the fluid line of the incorrectly coupled coupling head tearing off, as a result of which the first connecting line and as a result of this also the first control inlet are vented. In this case, the control valve is switched over by its second control inlet so that it is then able to switch over or activate the parking valve pneumatically. Such switching over of the parking valve into its parked state then results in safe and, in particular, accelerated venting of the control connection and as a result also of the spring-loaded brake cylinder. As a result, safe and rapid braking of the trailer vehicle is ensured even in an unsatisfactory operating state of the trailer vehicle. The parking valve accordingly has, in particular, the function of actuating and releasing the spring-loaded brake cylinder of the trailer vehicle. The second control inlet accordingly forms a redundant fallback level for the control valve in the event of the operating pressure at the first control inlet dropping owing to the operating pressure drop in the first connecting line or the control line. Such a redundant fallback level therefore improves further the operational safety of the trailer vehicle.

It is also contemplated for the control valve to be controlled by its first control inlet if in each case at least one satisfactory operating pressure is present at the first and at the second control inlets so that the parking valve cannot be controlled by the control valve. This control situation is present in the normal operating mode of the trailer vehicle, in particular when there is a correctly executed coupling sequence. Consequently, the control valve does not have to perform any control functions whatsoever for the parking valve and accordingly can be operated essentially in a state which is controlled by means of the first control inlet. The control by means of the first control inlet therefore permits wear-reducing operation of the control valve since the control valve is switched only in a non-pressurized state of the supply connection of the trailer vehicle.

In addition, it is contemplated that the control device has at least one second pneumatic supply connection which is connected to the second control inlet of the control valve via at least one second connecting line. The second control inlet of the control valve is, furthermore, also embodied as a pneumatically controlled control inlet. The second control inlet is accordingly connected to a further fluid pressure source via the second supply connection. The further fluid pressure source is embodied here in the form of a pressurized fluid container or pressurized fluid reservoir and is at least a component of a trailer vehicle of a utility vehicle. Furthermore, the second control inlet can be integrated particularly easily into the control valve and into the parking brake device. The reason for this may be that the second control inlet can only be coupled to the infrastructure which is present in any case in a trailer vehicle (such as a pressurized container and corresponding lines etc.).

Moreover, it is possible that the control device is embodied as a pneumatic control device. Service brake devices and parking brake devices which are controlled pneumatically or are controlled with compressed air are mostly used in trailer vehicles in the field of utility vehicles. Therefore, integration of a pneumatic control device into a parking brake device is particularly easy to implement in structural terms and in a functionally easy fashion and therefore advantageous. In addition, it is possible that the control device is embodied as at least one coherent pneumatic unit in the form of a pneumatic control module. Furthermore, there can be provision that the control device is embodied as a hydraulic control device.

Furthermore, there can be provision that at least one third connecting line is branched off from the second connecting line and is connected to at least one valve connection of the control valve. The third connecting line permits the control valve to be supplied with compressed air via the valve connection. Therefore, this third connecting line is particularly relevant for safety if the control valve switches over when there is a drop in pressure at the first control inlet and therefore the parking valve switches over. This switching over then occurs pneumatically by means of the compressed air supply of the control valve via this third connecting line.

It is also contemplated that the control valve is embodied as a pneumatically controllable 3/2-way valve and has at least one ventilation switched state and at least one venting switched state. The control valve is embodied here, in particular, as a double-acting pneumatically controllable 3/2-way valve. The configuration in the form of a 3/2-way valve forms, in particular, the advantage of connecting the control valve structurally as easily as possible both to the third connecting line (via the valve connection) and to the parking valve via a parking valve control line as well as additionally providing a venting connection for the parking valve control line. A 3/2-way valve accordingly satisfies the structurally simplest requirements for the control and venting of the parking valve via the parking valve control line and for the supply of this control line with compressed air.

Furthermore, it is contemplated that the parking valve is embodied as a directly manually actuable 3/2-way valve and has at least one ventilation switched state and at least one venting switched state. The configuration in the form of a 3/2-way valve also forms the advantage of integrating the parking valve as structurally easily as possible into the first connecting line, which requires two operating connections as well as in addition providing a venting connection for the control connection of the control device. A 3/2-way valve accordingly satisfies the structurally simplest requirements for integration into the first connecting line and for the ventilation and venting of the spring-loaded brake cylinder via the first connecting line and via its venting connection. The actuation element of the parking valve can accordingly be embodied as a combined pulling knob and pushbutton knob. Other actuation elements which are known in this context, such as rocker switches, toggle switches and/or rotary switches etc. can also be used. Furthermore, it is possible that in the venting switched state of the parking valve the control connection of the control device is vented, and wherein in the ventilation switched state of the parking valve the control connection of the control device is ventilated. Accordingly, in particular in the stationary state of the vehicle the spring-loaded brake cylinder of the trailer vehicle can be actuated and released very easily manually by means of the parking valve. The manual control of the spring-loaded brake cylinder provides, in particular for users of the trailer vehicle, such as e.g. forwarding agents with a large fleet of trailer vehicles, further functions such as, for example, the shunting of a trailer vehicle without a utility vehicle coupled to it. As a result, the trailer vehicle can be used in an even more variable fashion and adapted to the requirements of the user.

In addition, there can be provision that in the ventilation switched state of the control valve at least one control inlet of the parking valve is ventilated, and wherein in a venting switched state of the control valve the control inlet of the parking valve is vented. This type of control ensures that the operational safety of the trailer vehicle is improved, in particular in the ventilation switched state of the control valve. This is because owing to the pneumatic connection the ventilation switched state of the control valve occurs only in cases in which the supply connection is no longer connected to a compressed air source.

In addition it is contemplated that the control valve is in its ventilation switched state if the supply connection of the control device is not connected to a pneumatic pressure source so that the parking valve can be transferred into its venting switched state by means of the control valve. The ventilation switched state is present, in particular, if the supply connection of the control device is not connected to a compressed air source in the form of a compressed air coupling head of the utility vehicle. Such a missing connection can be present in an unsatisfactory state of the trailer vehicle owing to an incorrect coupling sequence. However, such a missing connection can also be desired, e.g. in order to maneuver the trailer vehicle with a maneuvering vehicle. However, in any case the parking valve is initially switched into its venting switched state by the control valve in order to ensure in all cases that the spring-loaded brake cylinder of the trailer vehicle is initially vented, which has a particularly advantageous effect on the operational safety of the trailer vehicle.

It is also contemplated that the control valve is in its venting switched state if the supply connection of the control device is connected to the pneumatic pressure source so that the parking valve can be transferred manually into its ventilation switched state or venting switched state. This case occurs during normal use of the trailer vehicle in combination with a utility vehicle so that, on the one hand, the control valve provides the possibility of activating the parking valve in a satisfactory state of the trailer vehicle (e.g. the parking of the trailer vehicle). Accordingly, a plurality of operating states of the trailer vehicle and the corresponding switched positions of the parking valve can be controlled particularly easily and efficiently by means of the control valve.

Moreover, it is possible that at least one shunt valve is arranged in the first connecting line, between the parking valve and the supply connection, wherein the shunt valve is additionally connected to the second supply connection of the control device. Additional circuit states and circuit state combinations for the control device and for the trailer vehicle are provided by means of the shunt valve. As a result, the benefit to the customer and the variability when using the trailer vehicle can be improved further. The connection of the shunt valve to the second supply connection also ensures additional and redundant supply of compressed air to the first connecting line, to the parking valve and to the control valve, as a result of which the operational safety of the trailer vehicle can be improved further.

There can also be provision that in a first ventilation switched state of the shunt valve the parking valve is connected to the supply connection by means of the shunt valve, and wherein in a second ventilation switched state of the shunt valve the parking valve is connected to the second supply connection by means of the shunt valve. This connection of the shunt valve to the parking valve permits, in particular, the parking valve to be supplied with compressed air from the second supply connection, independently of the supply connection. Such connection provides, in particular, the advantage that the trailer vehicle can nevertheless be moved by manual switching of the parking valve even if the control device is not connected to a compressed air source via the supply connection. The shunt valve can therefore be used, in particular, advantageously in shunting and maneuvering movements of the trailer vehicle without pressurizing the supply connection. The supply connection of the control device is embodied, in particular, as a main supply connection.

In addition, it is contemplated that in the second ventilation switched state of the shunt valve the control valve is connected to the second supply connection by means of the shunt valve and is thereby switched into the venting switched state. Therefore, in addition to the ventilation of the spring-loaded brake cylinder, the first control inlet of the control valve can also be ventilated by means of the second supply connection. This connection of the shunt valve to the control valve permits, in particular, the venting of the control inlet of the parking valve, so that the parking valve can actually now be actuated manually even if the supply connection is vented. Accordingly, such a connection of the control valve now permits the advantageous possibility that the trailer vehicle can nevertheless be moved by manual switching of the parking valve even if the control device is vented at the supply connection.

Further details and advantages of the invention will now be explained in more detail on the basis of the exemplary embodiments illustrated in the drawings.

BRIEF DESCRIPTION OF THE DRAWINGS

FIG. 1b shows a schematic partial sectional illustration of the control valve of the control device according to FIG. 1a.

FIG. 2a shows a schematic illustration of a second exemplary embodiment of the pneumatic circuit arrangement of the control device according to FIG. 1a.

FIG. 2b shows a schematic partial sectional illustration of the control valve of the control device according to FIG. 2a.

FIG. 3a shows a schematic illustration of a third exemplary embodiment of the pneumatic circuit arrangement of the control device according to FIG. 1a.

FIG. 3b shows a schematic partial sectional illustration of the control valve of the control device according to FIG. 3a.

DETAILED DESCRIPTION OF THE DRAWINGS

Figure 1A:
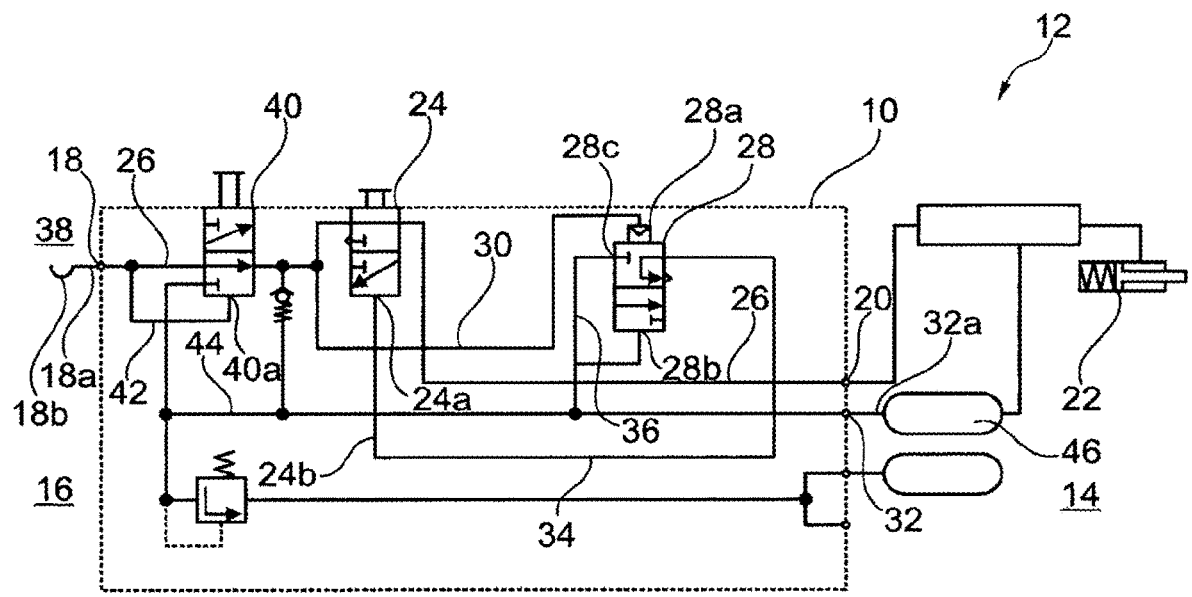
FIG. 1a shows a schematic illustration of a first exemplary embodiment of a pneumatic circuit arrangement of an exemplary control device according to the invention.

FIG. 1a shows a schematic illustration of a first exemplary embodiment of a pneumatic circuit arrangement of a control device 10.

According to FIG. 1a, the control device 10 is in a coupled or pressurized state so that the trailer vehicle 14 is in a ready-to-start state.

The control device 10 is embodied as a control device 10 for a parking brake device 12 of a trailer vehicle 14 of a utility vehicle 16.

The control device 10 is embodied as a pneumatic control device 10.

Moreover, the control device 10 can also alternatively be embodied as a hydraulic control device 10.

The control device 10 has a pneumatic supply connection 18.

According to FIG. 1, a supply line 18a is coupled to the supply connection 18 and a compressed air coupling head 18b is arranged at its free end.

This supply connection 18 is embodied as a main supply connection of the control device 10.

The control device 10 also has a control connection 20 for controlling a spring-loaded brake cylinder 22.

For example, FIG. 1a illustrates a spring-loaded brake cylinder 22, wherein, of course, the trailer vehicle can also have more than one spring-loaded brake cylinder 22.

The control device 10 has a directly manually actuable parking valve 24, a first connecting line 26 and a control valve 28 for controlling the parking valve 24.

The parking valve 24 is embodied as a directly manually actuatable 3/2-way valve 24.

The actuation element of the parking valve 24 can be embodied here as a combined pulling knob and pushbutton knob.

In addition, in this context there can be provision that further actuation elements which are known from the prior art such as a rocker switches, toggle switches, rotary switches and/or rotary-pushbutton switches etc. can also be used.

The parking valve 24 has a ventilation switched state and a venting switched state.

The parking valve 24 is arranged in the first connecting line 26.

In addition, the supply connection 18 and the control connection 20 can be connected by means of the parking valve 24 via the first connecting line 26.

The control valve 28 has, according to FIG. 1a, a first pneumatic control inlet 28a and a second pneumatic control inlet 28b.

The control valve 28 is embodied as a pneumatically controllable 3/2-way valve 28.

The control valve 28 has a ventilation switched state and a venting switched state.

Furthermore, a control line 30 is branched off from the first connecting line 26 and is connected to the first control inlet 28a of the control valve 28.

The control line 30 is branched off from the first connecting line 26 upstream of the parking valve 24.

The parking valve 24 also has a control inlet 24a.

The control inlet 24a is connected to the control valve 28 via a parking valve control line 24b.

The control device 10 has a second pneumatic supply connection 32.

This second supply connection 32 is connected to the second control inlet 28b of the control valve 28 via a second connecting line 34.

A third connecting line 36 is also branched off from the second connecting line 34.

The third connecting line 36 is connected to a valve connection 28c of the control valve 28.

The supply connection 18 has, according to FIG. 1a, a pressure-conducting connection to a pneumatic pressure source 18 or compressed air source 38 via the supply line 18a and via the compressed air coupling head 18b.

The pneumatic compressed air source 38 is embodied as a further compressed air coupling head (not shown in FIG. 1a) e.g. of a trailer control valve of the utility vehicle 16, which trailer control valve is coupled to the trailer vehicle 14 in the operationally ready state.

In the first connecting line 26, a shunt valve 40 is also arranged between the parking valve 24 and the supply connection 18.

The shunt valve 40 is embodied as a manually controllable or actuable 3/2-way valve 40.

The shunt valve 40 is additionally connected to the second supply connection 32 of the control device 10.

The shunt valve 40 is also connected to the second supply connection 32 via a fourth connecting line 44, wherein the fourth connecting line 44 is branched off from the second connecting line 34.

The shunt valve 40 has a first ventilation switched state and a second ventilation switched state.

The parking valve 24 is connected to the supply connection 18 by means of the shunt valve 40 in the first ventilation switched state of the shunt valve 40.

The shunt valve 40 has a control line 42 which is branched off from the first connecting line 26 upstream of the shunt valve 40 and opens into a control inlet 40a of the shunt valve 40.

In the first connecting line 26, the shunt valve 40 is arranged upstream of the parking valve 24.

According to FIG. 1a, the shunt valve 40 is in turn arranged downstream of the supply connection 18.

A second supply line 32a is also coupled to the second supply connection 32 and connects the second supply connection 32 to a compressed air vessel 46 of the trailer vehicle.

All the lines of the control device 10 which are described above can, of course, also be embodied as a drilled hole, duct, groove or as a combination thereof.

Other flow line connecting openings are also contemplated in this context, either alone or in combination.

According to FIG. 1a, the control device 10 also has a first and a second connection for an air suspension system of the trailer vehicle 14.

The first connection is connected to a further compressed air vessel for the compressed air supply of the air suspension system, wherein the second connection is connected to one or more air spring bellows.

In addition, the first and second connections are connected to the fourth connecting line 44 via a further connecting line and via an air suspension control valve.

The function of the control device 10 according to FIG. 1a can now be described as follows:

The function of the control device 10 is based on a coupled or pressurized state of the compressed air coupling head 18a, e.g. to a trailer control valve of the utility vehicle 16.

The pressure of the compressed air which is present in the control line 42 of the shunt valve 40 switches the shunt valve 40 into its first ventilation switched state.

The parking valve 24 consequently has a pressure-conducting connection to the supply connection 18 by means of the shunt valve 40 in the first ventilation switched state of the shunt valve 40.

For this purpose, the control inlet 24a of the parking valve 24 is connected to the control valve 28 via a parking valve control line 24b in order to activate the parking valve 24 by means of the control valve.

Therefore, operating pressure can be applied to the first control inlet 28a of the control valve 28 via the control line 30 of the control valve.

In addition, operating pressure is applied to the second control inlet 28b of the control valve 28 via the second connecting line 34.

The control valve 28 is therefore in its venting switched state, since the supply connection 18 of the control device 10 is connected to the pneumatic pressure source 38 in the form of the compressed air coupling head of the utility vehicle 16.

The control valve 28 is therefore controlled by means of its first control inlet 28a because a satisfactory operating pressure is respectively present at the first and at the second control inlets 28a, 28b.

As a result, the parking valve 24 can in turn not be controlled by the control valve 28.

Instead, the control inlet 24a of the parking value is vented via the parking valve control line 24b and by means of the control valve 28.

As a result, the parking valve 28 is correctly switched into its ventilation switched state because according to FIG. 1a the circuit arrangement of the control device 10 should be switched according to an operationally ready or ready-to-start state of the utility vehicle 16 and of the trailer vehicle 14.

The control connection 20 of the control device 10 is therefore ventilated in the ventilation switched state of the parking valve 24.

The ventilation switched state of the parking valve 24 is therefore assigned to a ready-to-start state of the trailer vehicle 14 or to a released state of the spring-loaded brake cylinder 22.

Accordingly, the venting switched state of the parking valve 24 is assigned to a parked state of the trailer vehicle 14 or to an actuated state of the spring-loaded brake cylinder 22.

The ventilation switched state of the parking valve 24 can additionally be detected at the pressed-in actuation element of the parking valve 24.

Accordingly, the spring-loaded brake cylinder 22 which is connected to the control connection 20 via a corresponding connecting line is also ventilated, as a result of which it is in the released state.

Figure 1B:
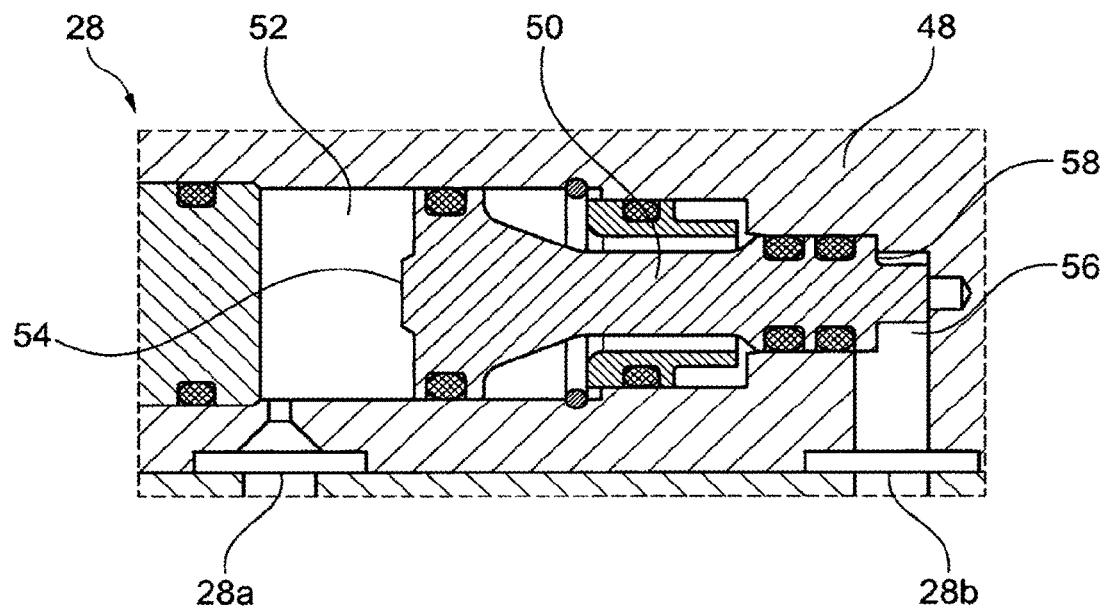

FIG. 1b shows a schematic partial sectional illustration of the control valve 28 of the control device 10 according to FIG. 1a.

The control valve 28 has a housing 48 with a control piston 50 which is guided therein in an axially movable fashion.

The first control inlet 28a of the control valve 28 opens into a first pressure chamber 52 which is formed by a first pneumatic active face 54 at a first end of the control piston 50 and by the housing 48.

In addition, the second control inlet 28b of the control valve 28 opens into a second pressure chamber 56, which is formed by a second pneumatic active face 58 at a second end of the control piston 50 and by the housing 48.

The first pneumatic active face 54 of the control piston 50 is larger than its second pneumatic active face 58.

Accordingly, a first pneumatically active diameter of the first pneumatic active face 54 is larger than a second pneumatically active diameter of the second pneumatic active face 58.

According to FIG. 1b, the control piston 50 is in a first switched position, as a result of which the venting switched state of the control valve 28 is brought about.

The control of the control valve 28 by means of its first control inlet 28b is therefore implemented with priority at similar input pressures because the first pneumatic active face 54 of the control piston 50 is larger than its second pneumatic active face 58.

This therefore results in the first switched position of the control piston 50.

Figure 2A:
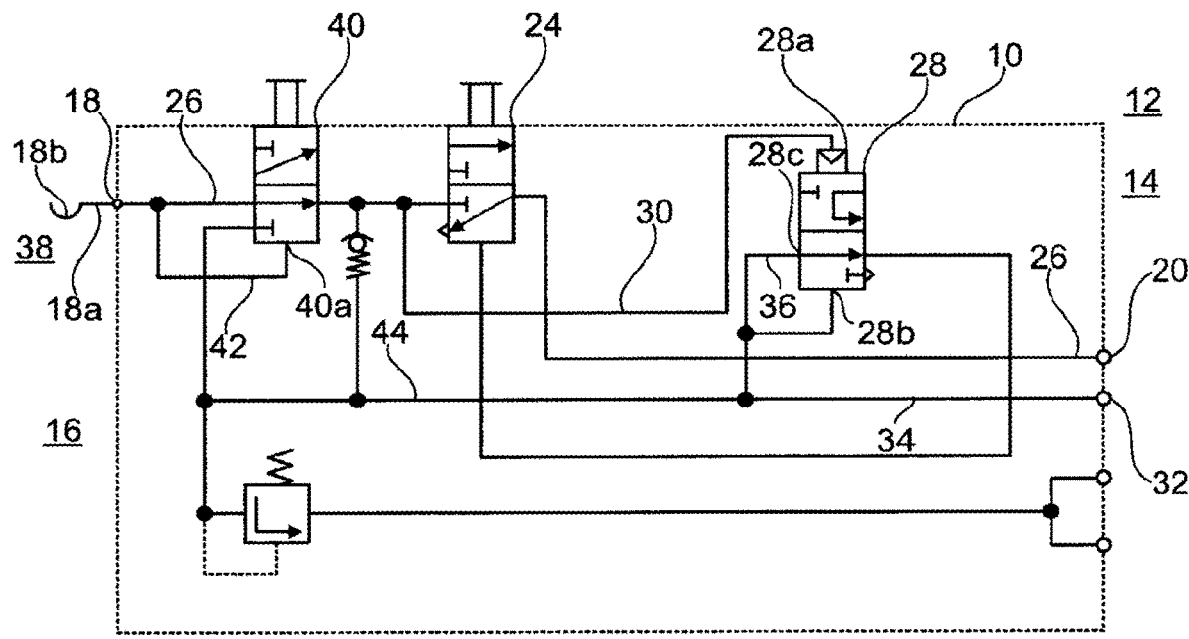

FIG. 2a shows a schematic illustration of a second exemplary embodiment of the pneumatic circuit arrangement of the control device 10 according to the invention according to FIG. 1a.

The uncoupled state of the supply connection 18 according to FIG. 2a occurs, in particular, in cases in which the compulsorily prescribed coupling sequence of the compressed air coupling head 18b has not been complied with.

This sequence prescribes that the compressed air coupling head for the service brake (not shown in FIG. 2a) always has to be firstly connected to the utility vehicle 16 before the compressed air coupling head 18b shown in FIG. 2a is correspondingly connected.

The coupling sequence which is not complied with results, in unfavorable cases, in unsatisfactory rolling away of the trailer vehicle 14.

After some time, tearing off, for example, of the supply line 18a or of the coupling head 18b unavoidably occurs, as a result of which the supply connection 18 is undesirably vented.

The function of the control device 10 according to FIG. 2a is therefore based on a state of the supply connection 18 in which it is undesirably uncoupled or not connected to compressed air.

The switched states of the shunt valve 40 do not relate to such an undesired loss of operating pressure at the supply connection, so that the shunt valve 40 remains in its first ventilation switched state even after the undesired loss of operating pressure.

The following explanations are therefore based on the shunt valve 40 in its first ventilation switched state.

As described above, in the first ventilation switched state of the shunt valve 40 the parking valve 24 is connected to the supply connection 18.

Since the supply connection 18 is now vented, the parking valve 24 is connected to the supply connection 18 via the shunt valve 40 and is correspondingly also vented, so that operating pressure is no longer present at the parking valve 24.

The parking valve 24 therefore no longer has a pressure-conducting connection to the supply connection 18 by means of the shunt valve 40 in the first ventilation switched state of the shunt valve 40.

As a result, the connecting line 26 upstream of the parking valve 14 is also vented, which results in additional venting of the control line 30 of the control valve 28.

The first control inlet 28a of the control valve 28 is therefore also vented via the control line 30.

However, the second connecting line 34 is not affected by the undesired loss of operating pressure, so that operating pressure continues to be applied to the second control inlet 28b of the control valve 28.

The operating pressure at the second control inlet 28b therefore exceeds the operating pressure at the first control inlet 28a.

In the event of an unexpected reduction in operating pressure in the first connecting line 26 and in the control line 30, the control valve 28 is controlled by its second control inlet 28b.

The control valve 28 can therefore be controlled in such a way that a switched state of the parking valve 24 can be activated pneumatically by means of the control valve 28 independently of an operating state of the supply connection 18, as a result of which the control connection 20 of the control device 10 is vented by means of the parking valve 24.

This results in switching over of the control valve 28 from its venting switched state into its ventilation switched state (illustrated in FIG. 2a).

The control valve 28 is therefore in its ventilation switched state, since the supply connection 18 of the control device 10 is not connected to a pneumatic pressure source 38.

However, the control valve 28 can also be in its ventilation switched state if, as described above, an unexpected reduction in operating pressure occurs at the supply connection 18.

The control valve 28 can therefore be controlled, according to FIG. 2a, by means of its second control inlet 28b in such a way that a switched state of the parking valve 24 can be controlled by means of the control valve 28.

In the ventilation switched state of the control valve 28, the control inlet 24a of the parking valve 24 is therefore ventilated.

Accordingly, the parking valve 24 can be transferred into its venting switched state by means of the control valve 28.

In the venting switched state of the parking valve 24, the control connection 20 of the control device 10 is then vented.

This results in actuation of the spring-loaded brake cylinder 22 by means of its integrated mechanical spring, so that after a short time the trailer vehicle 14 comes to a safe standstill after the undesired loss of operating pressure and no longer constitutes a hazard.

Figure 2B:
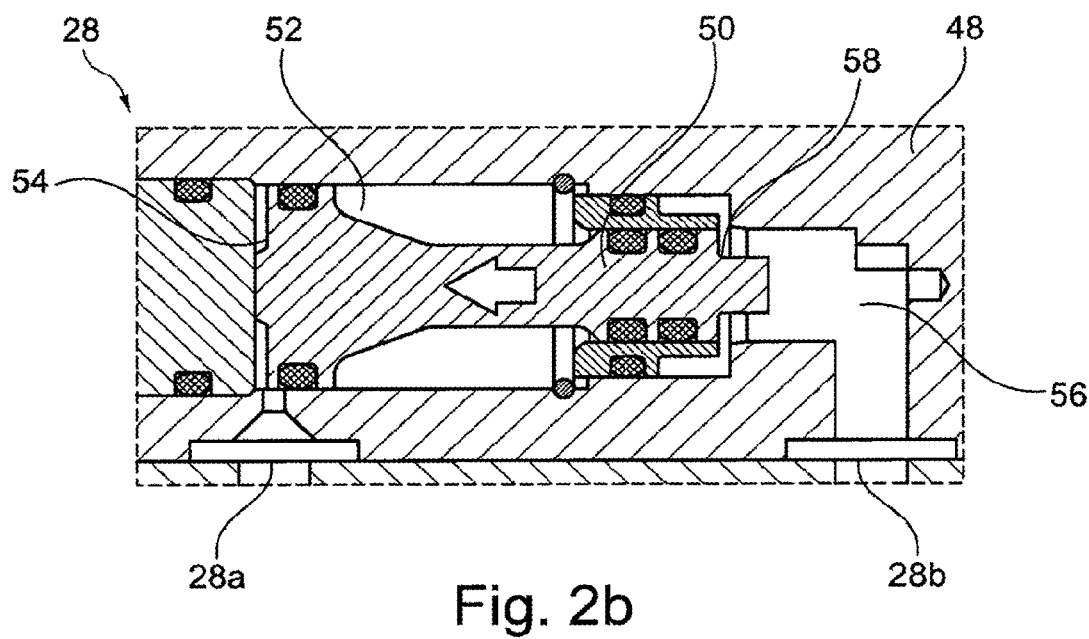

FIG. 2b shows a schematic partial sectional illustration of the control valve 28 of the control device 10 according to the invention according to FIG. 2a.

According to FIG. 2b, the control piston 50 is in its second switched position, as a result of which the ventilation switched state of the control valve 28 is brought about.

The control of the control valve 28 by means of its second control inlet 28b is therefore implemented because the first pressure chamber 52 is vented and therefore the pressure force on the first pneumatic active face 54 of the control piston 50 is lower than on its second pneumatic active face 58.

This therefore also results in the second switched position of the control piston 50.

Figure 3A:
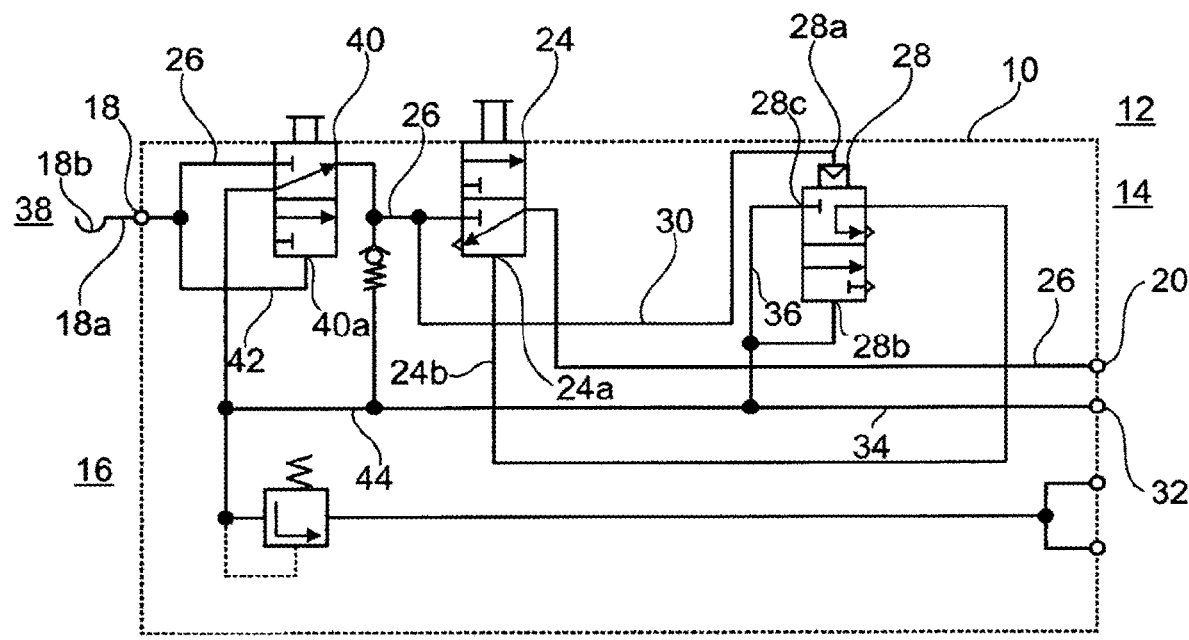

FIG. 3a shows a schematic illustration of a third exemplary embodiment of the pneumatic circuit arrangement of the control device 10 according to the invention according to FIG. 1a.

An uncoupled or vented state of the supply connection 18 according to FIG. 3a can, however, basically also be brought about intentionally.

An example of this intentional uncoupling is a maneuvering operation of the trailer vehicle 14 by means of a maneuvering vehicle.

The function of the control device 10 according to FIG. 2a is therefore based on a state of the supply connection 18 in which it is intentionally uncoupled or not connected to compressed air.

The ventilation switched state of the shunt valve 40 can then be selected freely by a vehicle driver.

The vehicle driver should set the second ventilation switched state of the shunt valve 40 manually for the maneuvering operation of the trailer vehicle 14.

The following explanations are therefore based on the shunt valve 40 in its second ventilation switched state.

The parking valve 24 therefore has a pressure-conducting connection to the second supply connection 32 by means of the shunt valve 40 in the second ventilation switched state of the shunt valve 40.

As a result, the connecting line 26 between the parking valve 24 and the shunt valve 40 is also ventilated, which results in additional ventilation of the control line 30 of the control valve 28.

Therefore, the first control inlet 28a of the control valve 28 is in turn also ventilated via the control line 30.

In addition, operating pressure is applied to the second control inlet 28b of the control valve 28 via the second connecting line 34.

The control valve 28 is accordingly controlled by means of its first control inlet 28a (cf. in this respect FIGS. 1a, 1b) which results in switching over of the control valve 28 from its ventilation switched state into its venting switched state (illustrated in FIG. 3a).

As a result of the venting switched state of the control valve 28, the control inlet 24a of the parking valve 24 is in turn vented and cannot be activated by means of the control valve 28.

The parking valve 24 can therefore be transferred manually into its ventilation or venting switched state by means of the vehicle driver.

Depending on the maneuvering function, the vehicle driver can therefore ventilate or vent the control connection 20 and therefore also the spring-loaded brake cylinder 22, i.e. can activate or deactivate the parking brake device 12.

If a vehicle driver inadvertently sets the first ventilation switched state of the shunt valve 40 and the ventilation switched state of the parking valve 24, the same circuit arrangement of the control device 10 is present as in FIG. 2a after the undesired uncoupling of the compressed air connection 18.

Figure 3B:
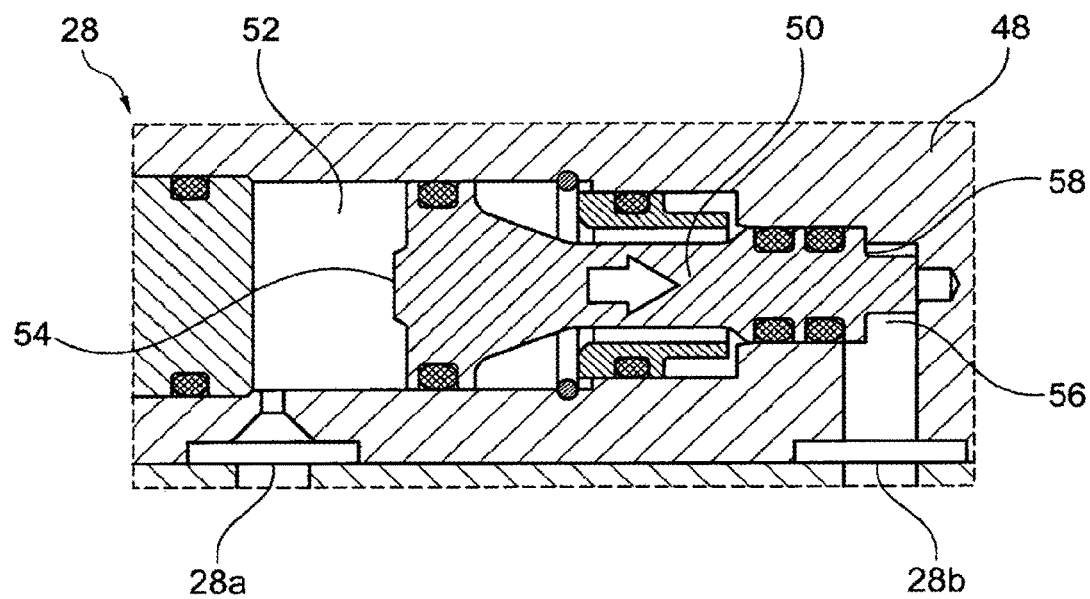

FIG. 3b shows a schematic partial sectional illustration of the control valve 28 of the control device 10 according to the invention according to FIG. 3a.

According to FIG. 3b, the control piston 50 is in its first switched position, as a result of which the venting switched state of the control valve 28 is brought about.

The control of the control valve 28 by means of its first control inlet 28a is therefore implemented with priority at similar input pressures because the first pneumatic active face 54 of the control piston 50 is larger than its second pneumatic active face 58.

This therefore results in the first switched position of the control piston 50.

LIST OF REFERENCE NUMBERS

10 Control device
12 Parking brake device
14 Trailer vehicle
16 Utility vehicle
18 Supply connection
18a Supply line
18b Compressed air coupling head
20 Control connection of the control device
22 Spring-loaded brake cylinder
24 Parking valve
24a Control inlet of the parking valve
24b Parking valve control line
26 First connecting line
28 Control valve
28a First control inlet of the control valve
28b Second control inlet of the control valve
28c Valve connection of the control valve
30 Control line of the control valve
32 Second supply connection
32a Second supply line
34 Second connecting line
36 Third connecting line
38 Pneumatic pressure source
40 Shunt valve
40a Control inlet of the shunt valve
42 Control line of the shunt valve
44 Fourth connecting line
46 Compressed air vessel of the trailer
48 Housing
50 Control piston
52 First pressure chamber 54 First pneumatic active face
56 Second pressure chamber
58 Second pneumatic active face

What is claimed is:

1. A utility vehicle control device for a parking brake device of a trailer vehicle, comprising:
    at least one pneumatic supply connection;
    at least one control connection for controlling at least one spring-loaded brake cylinder;
    at least one directly manually actuable parking valve;
    at least one first connecting line; and
    at least one control valve for controlling the parking valve, wherein
    the parking valve is arranged in the first connecting line,
    the supply connection and the control connection are connectable by the parking valve via the first connecting line,
    at least one control line is branched off from the first connecting line and is connected to at least one first pneumatic control inlet of the control valve,
    the control valve has at least one second pneumatic control inlet, and
    in an event of an unexpected reduction in operating pressure in the first connecting line and/or in the control line, the control valve is controlled by way of its second control inlet such that at least one switched state of the parking valve is activatable pneumatically by the control valve independently of at least one operating state of the supply connection, whereby the control connection is vented by way of the parking valve.

2. The control device as claimed claim 1, wherein the control valve is controlled by its first control inlet if in each case at least one satisfactory operating pressure is present at the first and at the second control inlets so that the parking valve cannot be controlled by the control valve.

3. The control device as claimed in claim 2, wherein the control device has at least one second pneumatic supply connection which is connected to the second control inlet of the control valve via at least one second connecting line.

4. The control device as claimed in claim 3, wherein the control device is a pneumatic control device.

5. The control device as claimed in claim 4, wherein the control valve is a pneumatically controllable 3/2-way valve and has at least one ventilation switched state and at least one venting switched state.

6. The control device as claimed in claim 5, wherein the parking valve is a directly manually actuable 3/2-way valve and has at least one ventilation switched state and at least one venting switched state.

7. The control device as claimed in claim 6, wherein the control valve is in its ventilation switched state if the supply connection of the control device is not connected to a pneumatic pressure source or if an unexpected reduction in operating pressure occurs at the supply connection so that the parking valve is transferrable into its venting switched state by the control valve.

8. The control device as claimed in claim 7, wherein the control valve is in its venting switched state if the supply connection of the control device is connected to the pneumatic pressure source so that the parking valve is transferrable manually into its ventilation switched state or venting switched state.

9. The control device as claimed in claim 1, wherein the control device has at least one second pneumatic supply connection which is connected to the second control inlet of the control valve via at least one second connecting line.

10. The control device as claimed in claim 9, wherein at least one shunt valve is arranged in the first connecting line, between the parking valve and the supply connection, and
the shunt valve is additionally connected to the second supply connection of the control device.

11. The control device as claimed in claim 9, wherein in a first ventilation switched state of the shunt valve, the parking valve is connected to the supply connection by way of the shunt valve, and
in a second ventilation switched state of the shunt valve, the parking valve is connected to the second supply connection by way of the shunt valve.

12. The control device as claimed in claim 9, wherein in the second ventilation switched state of the shunt valve, the control valve is connected to the second supply connection by way of the shunt valve and is thereby switched into the venting switched state.

13. The control device as claimed in claim 1, wherein the control device is a pneumatic control device.

14. The control device as claimed in claim 13, wherein at least one third connecting line is branched off from the second connecting line and is connected to at least one valve connection of the control valve.

15. The control device as claimed in claim 1, wherein the control valve is a pneumatically controllable 3/2-way valve and has at least one ventilation switched state and at least one venting switched state.

16. The control device as claimed in claim 15, wherein in the ventilation switched state of the control valve, at least one control inlet of the parking valve is ventilated, and
in a venting switched state of the control valve, the control inlet of the parking valve is vented.

17. The control device as claimed in claim 15, wherein the control valve is in its ventilation switched state if the supply connection of the control device is not connected to a pneumatic pressure source or if an unexpected reduction in operating pressure occurs at the supply connection so that the parking valve is transferrable into its venting switched state by the control valve.

18. The control device as claimed in claim 15, wherein the control valve is in its venting switched state if the supply connection of the control device is connected to the pneumatic pressure source so that the parking valve is transferrable manually into its ventilation switched state or venting switched state.

19. The control device as claimed in claim 1, wherein the parking valve is a directly manually actuable 3/2-way valve and has at least one ventilation switched state and at least one venting switched state.

20. The control device as claimed in claim 19, wherein in the venting switched state of the parking valve, the control connection of the control device is vented, and
in the ventilation switched state of the parking valve, the control connection of the control device is ventilated.

* * * * *